(12) United States Patent
Larsen et al.

(10) Patent No.: US 9,513,606 B1
(45) Date of Patent: Dec. 6, 2016

(54) SAFETY SYSTEMS AND METHODS FOR PRODUCTION ENVIRONMENTS

(71) Applicant: The Boeing Company, Seal Beach, CA (US)

(72) Inventors: Ty A. Larsen, Everett, WA (US); Robert R. Keever, Poulsbo, WA (US); Harold E. Hager, Bellevue, WA (US); Robert P. Higgins, Seattle, WA (US)

(73) Assignee: The Boeing Company, Chicago, IL (US)

( * ) Notice: Subject to any disclaimer, the term of this patent is extended or adjusted under 35 U.S.C. 154(b) by 788 days.

(21) Appl. No.: 13/857,544

(22) Filed: Apr. 5, 2013

(51) Int. Cl.
| | |
|---|---|
| G05B 9/02 | (2006.01) |
| G05B 23/02 | (2006.01) |
| G08B 21/00 | (2006.01) |
| G09G 5/00 | (2006.01) |
| G06K 9/00 | (2006.01) |
| H04K 1/00 | (2006.01) |
| G06F 19/00 | (2011.01) |

(52) U.S. Cl.
CPC ...................... G05B 9/02 (2013.01)

(58) Field of Classification Search
USPC .................................................. 700/79–80
See application file for complete search history.

(56) References Cited

U.S. PATENT DOCUMENTS

| | | | | |
|---|---|---|---|---|
| 2005/0002530 A1* | 1/2005 | Kogan | ................... | H04N 21/40 380/255 |
| 2007/0194944 A1* | 8/2007 | Galera et al. | ............. | F16P 3/14 340/686.6 |
| 2009/0072029 A1* | 3/2009 | Martin | ................ | G06Q 10/087 235/385 |
| 2010/0289662 A1* | 11/2010 | Dasilva et al. | ......... | F16P 3/147 340/686.6 |
| 2011/0279261 A1* | 11/2011 | Gauger et al. | ............ | F16P 3/14 340/539.1 |
| 2011/0298579 A1* | 12/2011 | Hardegger et al. | ....... | F16P 3/14 340/3.1 |
| 2012/0326959 A1* | 12/2012 | Murthi et al. | ......... | G06K 9/209 345/156 |

* cited by examiner

*Primary Examiner* — Mohammad Ali
*Assistant Examiner* — Md Azad
(74) *Attorney, Agent, or Firm* — DASCENZO Intellectual Property Law, P.C.

(57) ABSTRACT

Safety systems and methods for production environments are disclosed. Safety systems include at least one sensing device configured to detect presence of an unauthorized human and/or an authorized human at least partially within a defined safety zone, and a controller configured to automatically alter at least one aspect of the production environment responsive to the presence of the unauthorized human and/or the authorized human. Safety methods include detecting presence of an unauthorized human and/or an authorized human at least partially within a defined safety zone, and automatically altering at least one aspect of the production environment responsive to the detecting.

21 Claims, 3 Drawing Sheets

US 9,513,606 B1

SAFETY SYSTEMS AND METHODS FOR PRODUCTION ENVIRONMENTS

FIELD

The present disclosure relates to safety systems and methods for production environments.

BACKGROUND

Production environments are becoming increasingly more hazardous to production personnel due to the increasing automation of manufacturing, for example, utilizing robots. Massive tools that move very quickly, and unpredictably to non-trained personnel not familiar with the production environment, are particularly dangerous. Industrial zone controls, such as lockout/tagout procedures are commonly used, but such controls create inefficiencies in production environments. For example, an entire assembly line may be shut-down at the instruction of a single individual that detects an unsafe situation; however the unsafe situation may be confined to only a small subpart of the assembly line or the production environment, thus there being no need to shut-down the entire assembly line. Light curtain systems are an example of a safety device that may be set up around a discrete work station, with the light curtain system being configured to automatically shut down a machine tool, for example, if a human or other object breaks a light plane defined by the light curtains. However, such systems cannot distinguish between personnel that are authorized to enter the work station and personnel that are not authorized to enter the work station.

SUMMARY

Safety systems and methods for production environments are disclosed herein.

Safety systems include at least one sensing device configured to detect presence of an unauthorized human and/or an authorized human at least partially within a defined safety zone, and a controller configured to automatically alter at least one aspect of the production environment responsive to the at least one sensing device detecting presence of the unauthorized human and/or the authorized human at least partially within the defined safety zone. Some safety systems are configured to distinguish between humans and surrounding environment based at least in part on data detected by at least one sensing device. Some safety systems are configured to distinguish between human movement and non-human movement based at least in part on data detected by at least one sensing device. For example, a sensing device may be configured to detect thermal imagery of humans, and the safety system may be configured to distinguish between human thermal signatures and non-human thermal signatures. Other examples of safety systems are disclosed herein. In some safety systems, the aspects of the production environment altered by a controller are configured to have increasing levels of hazard deterring effects based on the degree of penetration into a defined safety zone by an unauthorized human.

Safety methods include detecting presence of an unauthorized human and/or an authorized human at least partially within a defined safety zone and automatically altering at least one aspect of the production environment responsive to the detecting. Some safety methods further include distinguishing between humans and surrounding environment. Some safety methods further include distinguishing between human movement and non-human movement based at least in part on the detecting. For example, the detecting may include detecting thermal imagery of humans and distinguishing between human thermal signatures and non-human thermal imagery. Other safety methods are disclosed herein.

DESCRIPTION

Safety systems and methods for production environments are disclosed herein. As used herein, a production environment corresponds to any suitable facility, location, structure, or other environment where manufacturing, testing, assembling, and/or other industrial process may be performed and in which one or more potential hazards for humans operating within or near the production environment are present. As illustrative, non-exclusive examples, facilities associated with the manufacture and assembly of aircraft, spacecraft, watercraft, land vehicles, and/or heavy machinery and facilities that include one or more assembly lines, machine tools, and/or robots are within the scope of production environments, as used herein.

Figure 1:
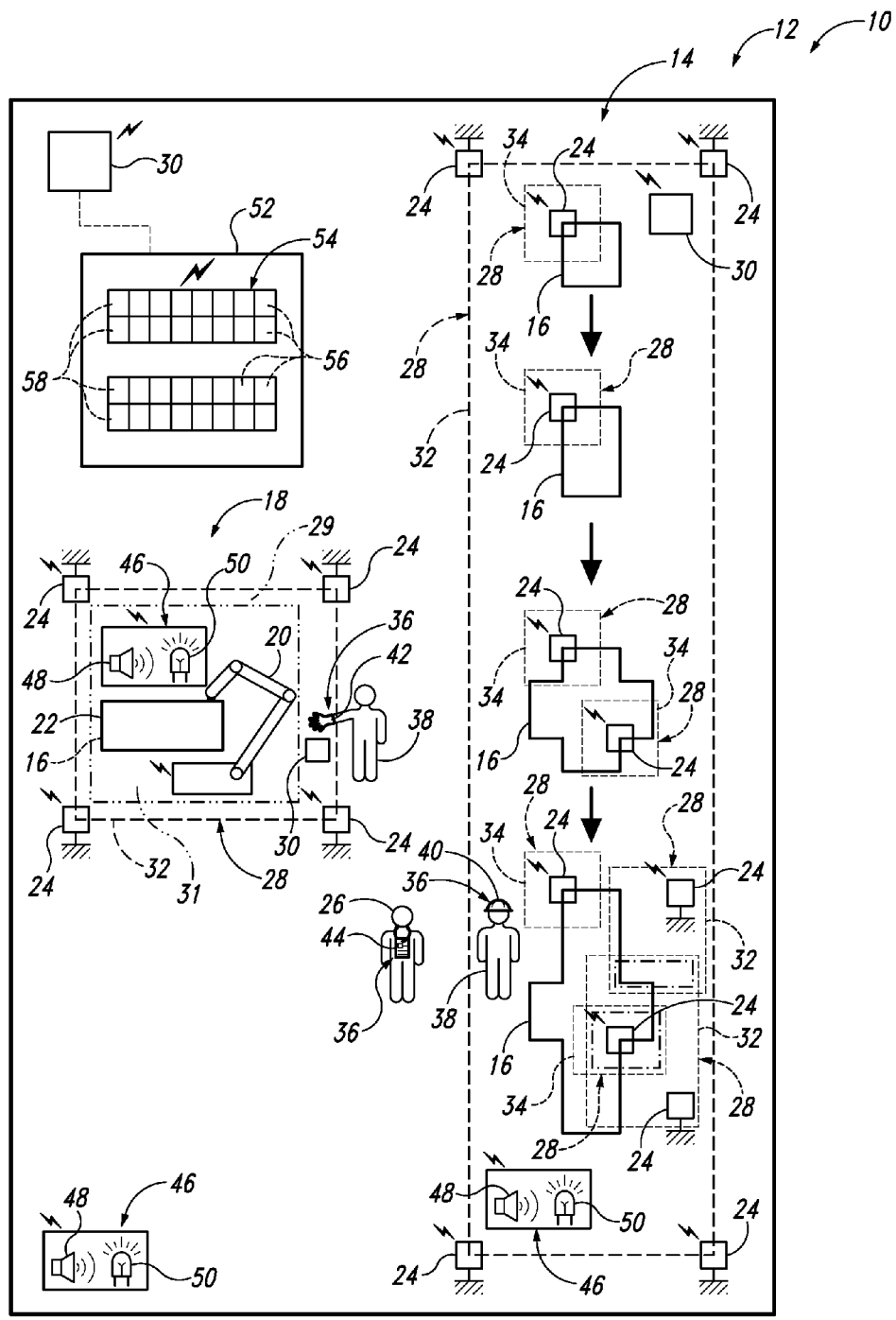
FIG. 1 is a schematic diagram representing illustrative, non-exclusive examples of safety systems according to the present disclosure.

FIG. 1 schematically represents illustrative, non-exclusive examples of production environments 10 that may be associated with one or more safety systems 12 and/or methods 100 according to the present disclosure. However, the specific layout and configuration of the schematic production environment 10 presented in FIG. 1 is provided solely to facilitate discussion of safety systems 12 and methods 100 according to the present disclosure, and safety systems 12 and methods 100 according to the present disclosure are not limited to use and implementation with the example production environment 10 schematically represented in FIG. 1.

The schematic representation of the production environment 10 in FIG. 1 includes an assembly line 14 associated with the cumulative assembly of an object 16 as it moves along the assembly line 14, with this motion represented by the arrows and with the cumulative assembly represented by the increase in size and change in shape of the schematic representation of the object 16. As illustrative, non-exclusive examples, object 16 may correspond to an aircraft, a spacecraft, a watercraft, a land vehicle, heavy machinery, etc. Object 16, or a component part thereof, additionally or alternatively may be referred to as a work piece 22.

The schematic representation of the production environment 10 in FIG. 1 also includes a stationary work station 18. Work station 18, for example, may be utilized to preassemble, to machine, or to otherwise alter a component part of object 16, prior to assembly on the assembly line 14. A work station 18 may be associated with and/or may include a machine tool 20, such as (but not limited to) a robot, a lathe, a mill, a drill press, a saw, a welding machine, a painting machine, etc. As an illustrative, non-exclusive example only, work station 18 is schematically depicted in FIG. 1 with a robot 20 operating on a work piece 22.

Safety systems 10 according to the present disclosure include at least one sensing device 24 that is configured to detect presence of an unauthorized human 26 and/or an authorized human 38 at least partially within a defined safety zone 28, and a controller 30 that is configured to automatically alter at least one aspect of a production environment 10 responsive to a sensing device 24 detecting presence of an unauthorized human 26 and/or an authorized human 38 within the defined safety zone 28. Additionally or alternatively, some sensing devices 24 may be configured to detect when an unauthorized human 26 and/or an authorized human 38 is imminently about to enter a defined safety zone 28, and an associated controller 30 may be configured to automatically alter at least one aspect of the production environment 10 responsive to such detection by a sensing device 24. In other words, some systems 12 may be configured with more than one level of detection relative to a defined safety zone 28, with such systems optionally being configured to alter one or more aspects of the production environment 10 responsive to which whether or not an unauthorized human 26 and/or an authorized human 38 has physically entered a defined safety zone 28 or has only approached a defined safety zone 28. In some systems 12, different aspects of the production environment 10 may be configured with different levels of hazard deterring effect depending on the extent of penetration into a defined safety zone 28. As an illustrative, non-exclusive example, an audible alarm and/or a visible alarm may be considered to have a first level of hazard deterring effect, while the slowing of a machine tool or an assembly line may be considered to have a second, higher level of deterring effect, and the stopping of a machine tool or an assembly line may be considered to have a third, higher level of deterring effect. Other examples also are within the scope of the present disclosure.

Additionally or alternatively, a defined safety zone 28 may have more than one sub-zone, such as with a first sub-zone representing a volume of space adjacent to a perimeter of the defined safety zone 28 and with a second sub-zone representing a volume of space that is spaced inward from a perimeter of the defined safety zone 28. In such embodiments, when an unauthorized human 26 and/or an authorized human 38 enters the first sub-zone, a first aspect of the production environment 10 may be altered, and when an unauthorized human 26 and/or an authorized human 38 enters the second sub-zone, a second aspect of the production environment 10 may be altered. In connection with illustrative, non-exclusive example of a work station 18, FIG. 1 schematically illustrates an example of a defined safety zone 28 having a first sub-zone 29 and a second sub-zone 31 spaced inward from the perimeter of the defined safety zone 28 and schematically outlined with a dash-dot-dot line. Any number of optional sub-zones may be used, including zero sub-zones, two sub-zones, and more than two sub-zones.

As used herein, a defined safety zone 28 is a three-dimensional volume of space, within which a potential hazard to a human may be present at least during some period of time. Illustrative, non-exclusive examples of potential hazards include (but are not limited to) movement of a machine tool, movement of an object, movement of a work piece, movement of an assembly line, etc. A defined safety zone 28 may be fixed in space, in so far as the safety zone 28 does not move relative to the production environment 10. In FIG. 1, a fixed safety zone 32 is schematically illustrated by the dashed box encompassing the work station 18, and a fixed safety zone 32 is schematically illustrated by the dashed box encompassing the assembly line 14. However, a defined safety zone 28 also may be movable in space, for example, such that it moves together with a machine tool, a work piece, an object, an assembly line, and/or with any other structure associated with a production environment 10. In FIG. 1, various movable safety zones 34 are schematically illustrated by the dashed boxes associated with the object 16 that moves along the assembly line 14. Accordingly, a sensing device 24 may be configured to be selectively and operatively coupled to and decoupled from a work piece, a machine tool, an object, and/or any other structure associated with a production environment 10. In some such examples, such coupling and decoupling may be accomplished without destruction or other alteration of the structure to which it is attachable.

Moreover, a movable safety zone 34 may be defined at any desired moment in time. For example, as schematically illustrated in FIG. 1, object 16 initially only has a single safety zone 28 in the form of a movable safety zone 34 associated with a single sensing device 24; however, an additional movable safety zone 34 is established at the third representation of object 16, and two additional fixed safety zones 32 are established at the fourth representation of object 16. These optional configurations of fixed and movable safety zones 28 are provided solely by way of example and do not limit the scope of the present disclosure to the examples discussed and schematically illustrated herein.

A safety zone 28 may be established by and/or associated with a single sensing device 24, and/or safety zone 28 may be defined by and/or associated with more than one sensing device 24. In some examples, a safety zone 28 may correspond to a field of view, or sensing zone, of a sensing device 24. For example, a sensing device 24 may inherently (or adjustably) have a volume of space relative to the sensing device 24, within which the sensing device 24 is capable of detecting presence of an unauthorized human 26 and/or an authorized human 38. In some examples, a safety zone 28 may correspond to the full extent of a sensing device's sensing zone. In some examples, a safety zone 28 may correspond to a subset of a sensing device's sensing zone. Additionally or alternatively, a safety zone 28 may correspond to the collective volume of the sensing zones of more than one sensing device 24, such as corresponding to the example work station 18 and/or the example assembly line 14 in FIG. 1, with each of these two safety zones 28 being schematically illustrated in connection with four sensing devices 24 generally spaced-apart in a rectangular pattern. Additionally or alternatively, a safety zone 28 may be defined by overlapping regions of two or more sensing device's sensing zones, such as schematically illustrated in FIG. 1 by the overlapping regions outlined with dash-dot boxes and associated with the object 16 in its fourth position. Again, these optional configurations of safety zones 28 are provided solely by way of example and do not limit the scope of the present disclosure to the examples discussed and schematically illustrated herein.

Sensing devices 24 may take any suitable form, such that a sensing device 24 is configured to detect presence of an unauthorized human 26 and/or an authorized human 38 at least partially within a safety zone 28, to detect presence of an unauthorized human 26 and/or an authorized human 38 fully within a defined safety zone 28, to detect imminent entry of an unauthorized human 26 and/or an authorized human 38 into a defined safety zone 28, and/or to detect presence of an unauthorized human 26 and/or an authorized human 38 at least partially within one or more sub-zones of a defined safety zone 28. Illustrative, non-exclusive examples of sensing devices 24 include (but are not limited to) cameras, multispectral cameras, multispectral sensors, infrared cameras, infrared sensors, optical cameras, optical sensors, ultraviolet cameras, ultraviolet sensors, combined visible and infrared cameras, and wide dynamic range (WDR) cameras. In some embodiments, the safety system 12 may be configured to distinguish humans from the surrounding environment. In some embodiments, the safety system 12 may be configured to distinguish between human movement and non-human movement based at least in part on data that is detected by the sensing device 24. For example, a safety system 12 may be able to distinguish between the movement of a machine tool 20 and the movement of a human. Additionally or alternatively, a safety system 12 may be able to distinguish between the movement of an object 16, such as on an assembly line 14, and the movement of a human. As an illustrative, non-exclusive example, a safety system 12 may be configured to recognize thermal signatures of humans, such as associated with a torso and limbs. Additionally or alternatively, a safety system 12 may be able to distinguish between human thermal signatures and non-human thermal signatures. Such safety systems 12 may be facilitated by use of sensing devices 24 that have infrared sensing capabilities.

Additionally or alternatively, safety systems 12 may include one or more tags, or other markers, 36 that are associated with humans and/or that are configured to be operatively coupled to and/or associated with humans. In such embodiments, a sensing device 24 may be configured to detect the presence of a tag 36 within a safety zone 28 and/or a sub-zone thereof. For example, a tag 36 may be associated with a human that is authorized to work within a given safety zone 28, with such a human being referred to as an authorized human 38. Additionally or alternatively, a tag 36 may be associated with an unauthorized human 26 that is not authorized to work within a given safety zone 28. A human may be authorized to work within one safety zone 28 within a production environment 10 but not within another safety zone 28 within the production environment 10. Accordingly, a human may qualify as an authorized human 38 in connection with one or more safety zones 28 and may be an unauthorized human 26 in connection with one or more other safety zones 28 within a production environment 10.

As an illustrative, non-exclusive example, a human that is authorized to work within a given safety zone 28 may be specially trained to work within that given safety zone 28. For example, a machine tool 20 may require special training to use the machine tool 20, such as to avoid potential hazards associated with the machine tool 20. Accordingly, personnel that are trained on a specific machine tool 20 may be tagged with a tag 36 that indicates the personnel as an authorized human 38 within a safety zone 28 associated with the machine tool 20. Conversely, personnel that are not trained on a specific machine tool 20 may not be tagged with a tag 36 that indicates the personnel as an authorized human 38. Alternatively, personnel that are not trained on a specific machine tool 20 may be tagged with a tag 36 that indicates the personnel as an unauthorized human 26.

A tag 36 may take any suitable form such that a sensing device 24 is configured to detect its presence within a safety zone 28. A tag 36 may be described as including a predefined detectable configuration that is detectable by a sensing device 24. As illustrative, non-exclusive examples, a predefined detectable configuration may include one or more of a specifically configured surface, a retro-reflective surface, a surface having predefined distinguishing indicia, a predefined thermal signature, a fluorescence signature, and/or a radiative signature.

Tags 36 may be configured to be operatively coupled to and/or worn by a human. For example, tags 36 may be configured to be operatively coupled to, may be embodied in, and/or may comprise one or more of clothing, a vest, a harness, a sash, a glove, headgear, a helmet, a jumpsuit, a jacket, pants, a top, a bottom, sleeves, an arm band, a leg band, a neck band, a head band, a ring, a bracelet, a knee band, a necklace, a badge, and an anklet. In FIG. 1, a tag 36 is schematically illustrated in the form of a helmet 40 associated with an authorized human 38 within the safety zone 28 associated with the assembly line 14. In FIG. 1, a tag 36 also is schematically illustrated in the form of a glove 42 associated with an authorized human 38 adjacent to the safety zone 28 associated with the work station 18. In FIG. 1, a tag 36 also is schematically illustrated in the form of a neck-worn badge 44 associated with the schematic representation of an unauthorized human 26.

The schematic representation of the authorized human 38 having a tag 36 in the form of a glove 42 is illustrated adjacent to the safety zone 28 associated with the work station 18 and with only his/her arm extending into the safety zone 28. This schematically represents that a safety system 12 may be configured to distinguish between authorized portions of a human and unauthorized portions of a human within a safety zone 28. For example, it may be that a work station 18 or other region or location within a production environment 10 is considered to pose an acceptable level of risk associated with potential injury to a hand or arm of an authorized human 38, but an unacceptable level of risk associated with potential injury to a head, torso, or leg of an authorized human 38. Accordingly, a safety system 12 may be configured to distinguish between a tagged portion of an authorized human 38 and a non-tagged portion of an authorized human 38. Additionally or alternatively, a safety system 12 may be configured to distinguish between different human movements and/or between movements of different portions of a human. For example, a safety system 12 may be configured to distinguish between a thermal signature of an arm and a thermal signature of a torso. Accordingly, a controller 30 may be able to alter an aspect of the production environment 10 based on detection of a potential safety threat that is considered to be unacceptable in the production environment 10.

Additionally or alternatively, with continued reference to the illustrative, non-exclusive example of the authorized human 38 having a tag 36 in the form of a glove 42, some systems 12 may be configured to permit entry of a specific portion of a human, such as a hand or lower arm region, within a first sub-zone 29. However, if more of the authorized human 38 enters the first sub-zone 29, such as the torso of the authorized human 38, an aspect of the production environment 10 may be altered. Moreover, if any portion of the authorized human 38, whether the hand, lower arm region, or any other portion of the human's body enters the second sub-zone 31, then an aspect of the production environment 10 may be altered.

Various aspects of production environments 10 may be altered in response to a sensing device 24 detecting presence of an unauthorized human 26 and/or an authorized human 38 at least partially within a defined safety zone 28, detecting presence of an unauthorized human 26 fully within a defined safety zone 28, detecting imminent entry of an unauthorized human 26 and/or an authorized human 38 into a defined safety zone 28, and/or detecting presence of an unauthorized human 26 and/or an authorized human 38 at least partially within one or more sub-zones of a defined safety zone 28. For example, one or more of movement of a machine tool 20, movement of a work piece or other object 16, and/or movement of an assembly line 14 may be altered in response to various detections by a sensing device 24. As an illustrative, non-exclusive example, the movement of a machine tool 20, an object 16, or an assembly line 14 may be slowed. Additionally or alternatively, movement of a machine tool 20, an object 16, or an assembly line 14 may be stopped. Then, upon detection of the absence of an unauthorized human 26 and/or an authorized human 38 within the defined safety zone 28, the movement of the machine tool 20, the object 16, and/or an assembly line 14 may be automatically returned to a default configuration, such as corresponding to a default speed.

Additionally or alternatively, a production environment 10 and/or a safety system 12 may include one or more alarm systems 46 that are configured to be activated upon various detections by a sensing device 24. For example, an alarm system 46 may include one or more of an audible alarm 48 and/or a visible alarm 50. In FIG. 1, three alarm systems 46 are schematically presented, including an alarm system 46 associated with work station 18, an alarm system 46 associated with assembly line 14, and an alarm system 46 associated with the whole of the production environment 10, schematically representing that any number of optional alarm systems 46 may be incorporated into a production environment 10 and/or a safety system 12. Using the schematically represented work station 18 as an example, if an unauthorized human 26 enters the safety zone 28 associated with the work station 18, one or both of the audible alarm 48 and/or the visible alarm 50 may be activated to alert the unauthorized human 26 or other personnel that the unauthorized human 26 has entered the safety zone 28. Additionally or alternatively different degrees of alarm may be configured based on the extent of entry into a safety zone 28. As an illustrative, non-exclusive example, if an unauthorized human 26 only partially enters a defined safety zone 28, only the audible alarm 48 may optionally be activated; however, if the unauthorized human fully enters the defined safety zone 28, both the audible alarm 48 and the visible alarm 50 may be activated to more strenuously alert the unauthorized human 26 and/or other personnel of the breach of the safety zone 28. Then, upon retreat by the unauthorized human 26 out of the safety zone 28, the alarm system 46 may be deactivated, or otherwise cease to emit one or both of an audible alarm 48 and/or a visible alarm 50.

Additionally or alternatively, in examples of systems 12 that are configured to detect imminent entry of an unauthorized human 26 and/or an authorized human 38 into a defined safety zone 28 and/or that utilize sub-zones associated with a defined safety zone 28, different aspects of the production environment 10 may be altered based at least in part on the degree to which an unauthorized human 26 and/or an authorized human 38 has approached and/or has entered a defined safety zone 28. Such different aspects optionally may (but are not required to) have an increasing level of hazard deterring effect based on the degree to which an unauthorized human 26 and/or an authorized human 38 has approached and/or entered a defined safety zone 28. Stated differently, the impact of various aspects of the production environment 10 that may be altered in response to an increased risk to a human may escalate in nature, so as to more forcefully alert the unauthorized human 26 and/or alter the production environment 10 to minimize the risk to the unauthorized human 26. For example, (i) based on a first level of approach or entry into a defined safety zone 28, an audible alarm 48 and/or a visible alarm 50 may be triggered, (ii) based on a second level of approach or entry into the defined safety zone 28, a machine tool 20, such as a robot, may be slowed, and (iii) based on a third level of approach or entry into the defined safety zone, the machine tool may be stopped. Other examples of increasing and/or varying levels of hazard deterring effects also are within the scope of the present disclosure.

In examples of systems 12 that are configured to detect an authorized human 38 relative to a defined safety zone 28, an illustrative, non-exclusive example of an aspect of the production environment 10 that may be altered includes (but is not limited to) a predetermined configuration, or mode, of a machine tool 20, such as a robot. For example, when an authorized human 38 enters a defined safety zone, the robot may reconfigure from a default configuration into a watch and learn configuration. A watch and learn configuration is a configuration of a machine tool, in which the machine tool senses a worker's movements and actions, learns from such movements and actions, and alters its own actions accordingly. For example, a machine tool may learn that a worker has a preferred order of assembling an assembly of parts and adapt how the parts are arranged for assembly to best fit with that particular worker. The machine tool may be capable to distinguishing between multiple workers (such as multiple authorized humans 38) and learn and adapt its movements accordingly. Other examples also are within the scope of the present disclosure.

As discussed, safety systems 12 include at least one controller 30 that is configured to automatically alter at least one aspect of the production environment 10 responsive to a sensing device 24 detecting presence of an unauthorized human 26 and/or an authorized human 38 at least partially within a defined safety zone 28, detecting presence of an unauthorized human 26 and/or an authorized human 38 fully within a defined safety zone 28, detecting imminent entry of an unauthorized human 26 and/or an authorized human 38 into a defined safety zone 28, and/or detecting presence of an unauthorized human 26 and/or an authorized human 38 at least partially within one or more sub-zones of a defined safety zone 28. In FIG. 1, various controllers 30 are schematically presented, representing that any suitable number and configuration of controllers 30 may be utilized with safety system 12 and/or a production environment 10. For example, a single controller 30 may be used in connection with the whole of the production environment 10. Additionally or alternatively, a controller 30 may be associated with individual safety zones 28, such as associated with a work station 18, with an assembly line 14, with a fixed safety zone 32, and/or with a movable safety zone 34. Additionally or alternatively, a sensing device 24 may include a controller 30 and/or may be operatively linked to a controller 30. Controllers 30 may take any suitable form, including (but not limited to) a computer system, one or more computers, one or more servers, software, electronic hardware, etc. Examples of software include non-transitory computer readable storage media including computer-executable instructions that, when executed, direct a computer to perform a method according to the present disclosure.

Some production environments 10 include an inventory control system 52, for example, an inventory control system 52 that is configured to track the location of parts 54 within the production environment 10. For example, the inventory control system 52 may utilize radio-frequency identification (RFID) tags 56 associated with parts 54 and/or location awareness system features 58 associated with parts 54. Illustrative, non-exclusive examples of location awareness system features 58 that may be utilized with or otherwise implemented with an inventory control system 52 include (but are not limited to) pseudo-satellite (pseudolite) augmented global positioning system (GPS) features, laser based tracking system features, etc.

Additionally or alternatively, the inventory control system 52 may utilize tags 36 associated with parts 54. Safety systems 12 and/or controllers 30 thereof may be configured to communicate with or otherwise interact with such an inventory control system 52. For example, the controller 30 of a safety system 12 may be configured to automatically alter an aspect of the production environment 10 responsive to both the detection by a sensing device 24 of the presence of an unauthorized human 26 within a defined safety zone 28 and a predetermined configuration associated with the inventory control system 52. As illustrative, non-exclusive examples, such a predetermined configuration may include one or more of a presence of a predetermined part 54 within a defined safety zone 28, presence of a predetermined part 54 on or adjacent to an object 16, presence of a predetermined part 54 within a predetermined locale, movement of a predetermined part 54 within a defined safety zone 28, movement of a predetermined part 54 relative to a work piece or object 16, and/or movement of a predetermined part 54 within a predetermined locale. A predetermined locale may refer to any region or zone within a production environment 10 whether directly associated with, overlapping with, and/or being a safety zone 28 or otherwise.

In some embodiments, a safety system 12 may be configured to establish a safety zone 28 responsive to presence of a predetermined part 54 within a predetermined locale. For example, a hazard may not be present until such time that a specific part 54 is in a specific position within the production environment 10. Accordingly, a given safety zone 28 may not need to be established until a specific part 54 has been installed on an object 16, until a predetermined part has reached a specific location along an assembly line 14, or until some other criteria associated with the movement and/or location of a part 54. Using an aircraft as an illustrative, non-exclusive example, the space within the vicinity of a landing gear system may not be hazardous to humans until such time that the pivotal arm assembly of the landing gear is installed and configured to pivot relative to the body of the aircraft. Accordingly, a safety system 12 may be configured to establish a safety zone 28 around the vicinity of the landing gear only upon installation of the pivotal arm assembly, with such installation being detected by an inventory control system 52 that is capable of recognizing the moment in time that the pivotal arm assembly is in a specific locale within the production environment 10. As another illustrative, non-exclusive example, the space within a nacelle may not be hazardous to production personnel until such time that the turbo-fan blades have been installed. Accordingly, a safety system 12 may communicate with an inventory control system 52, such that a safety zone 28 around the nacelle is not established until such time that the turbo-fan blades are within the vicinity of the nacelle, indicating that the vicinity may contain hazardous conditions, and thus that unauthorized humans 26 should not be permitted in the vicinity. Other examples associated with aircraft, as well as with other objects 16 are within the scope of the present disclosure.

Figure 2:
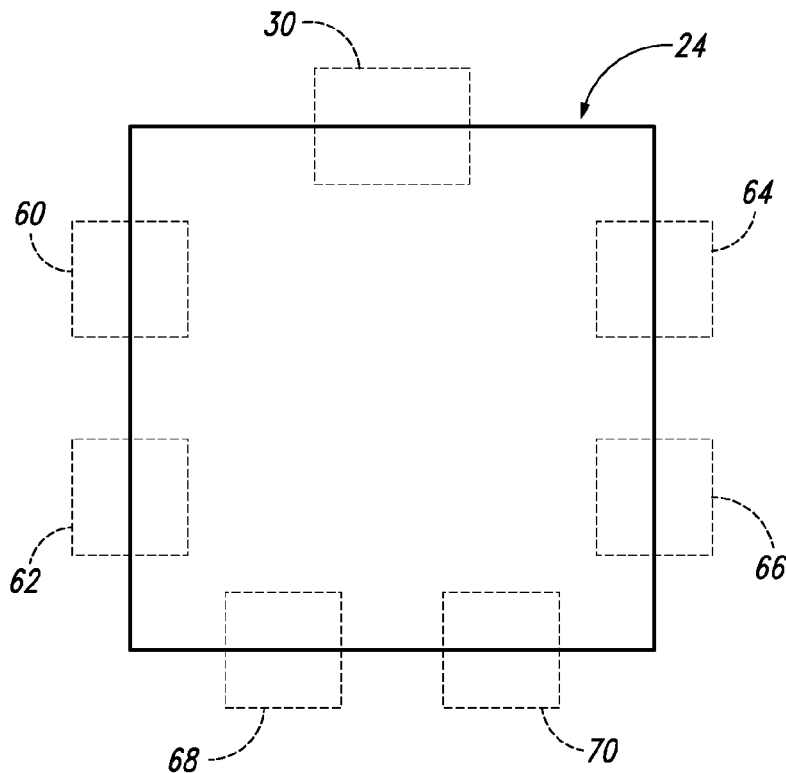
FIG. 2 is a schematic diagram representing sensing devices according to the present disclosure.

FIG. 2 schematically represents sensing devices 24. As schematically illustrated, a sensing device 24 may include and/or be associated with one or more of a controller 30, a location awareness system feature 60, an orientation device 62, a movement detection device 64, a communication device 66, a power supply 68, and/or a mounting structure 70. Illustrative, non-exclusive examples of location awareness system features 60 that may be utilized with or otherwise implemented with a sensing device 24 include (but are not limited to) pseudolite augmented GPS features, laser based tracking system features, etc. In FIG. 2, these various components are schematically and optionally illustrated as overlapping sensing device 24, schematically representing that a sensing device 24 may include such components and/or that a sensing device 24 may be configured to be operatively coupled to, or otherwise connected to or linked to, such components.

In embodiments of safety systems 12 with sensing devices 24 that include and/or otherwise utilize location awareness system features 60, the controller 30 associated with a sensing device 24 may be configured to automatically alter an aspect of the production environment 10 responsive both to the presence of an unauthorized human 26 at least partially within a defined safety zone 28 and the sensing device 24 being positioned within a predetermined locale such as determined by the location awareness system feature. For example, using the schematic example of a sensing device 24 associated with the object 16 at its first position on the assembly line 14 of FIG. 1, the safety zone 28 may not be considered to be hazardous to an unauthorized human 26 until such time that the object 16 reaches its third position on the assembly line 14 of FIG. 1. Using a location awareness system feature 60 associated with the sensing device 24, an unauthorized human 26 within the safety zone 28 may not trigger the alarm system 46 until such time that the sensing device 24 has reached a specific predetermined position along the assembly line 14.

Additionally or alternatively, sensing devices 24 and/or safety systems 12 may be configured to interact with and/or otherwise utilize other location-based systems associated with production environments 10. For example, in the aerospace industry, it is common to utilize optical-based production line positioning systems that utilize retro-reflective markers, with these optional systems being within the scope of location awareness systems, as used herein.

In embodiments of sensing devices 24 that include and/or otherwise utilize an orientation device 62 that is configured to detect an orientation of the associated sensing device 24, the controller 30 may be configured to automatically alter an aspect of the production environment 10 responsive to one or more various detections by the sensing device, as discussed herein, and to the orientation of the sensing device 24, the orientation of a work piece or other object 16, and/or the orientation of a machine tool 20. For example, the safety zone 28 may not be considered to be hazardous to an unauthorized human 26 until such time that some aspect of the production environment 10 is orientated to a predetermined orientation.

In embodiments of safety systems 12 with sensing devices 24 that utilize a movement detection device 64 (such as that is configured to detect movement of a sensing device 24, a work piece or other object 16, and/or a machine tool 20), the controller 30 associated with a sensing device 24 may be configured to automatically alter an aspect of the production environment 10 responsive to one or more detections by the sensing device 24 of movement of one or more of the sensing device 24, movement of the work piece or other object 16, and/or movement of the machine tool 20. For example, referring to the illustrative, non-exclusive example of the work station 18 schematically represented in FIG. 1, the safety zone 28 may not be considered to be dangerous until such time that the machine tool 20 is in motion. Illustrative, non-exclusive examples of movement detection devices 64 include (but are not limited to) accelerometers.

Various component parts of safety systems 12 and production environments 10 may be configured to communicate with each other, with a corresponding controller 30, and/or with associated computers, servers, or other computing devices. In FIG. 1, this optional communication feature is schematically represented by the various lightning bolts, schematically representing wireless communication, such as over a wireless network; however, wired communication also may be used. For example, a sensing device 24 may communicate to an associated controller 30 when the sensing device 24 has moved into a predetermined locale, has become oriented to a predetermined orientation, and/or has moved according to a predetermined movement.

In some embodiments, multiple sensing devices 24 may be configured to communicate with each other. Accordingly, two or more sensing devices 24 may facilitate the collective establishment of a safety zone 28. Additionally or alternatively, two or more sensing devices 24 may communicate with each other to calibrate a safety zone 28 relative to the two or more sensing devices 24. Other configurations also are within the scope of the present disclosure.

Mounting structure 70 associated with sensing devices 24 may take any suitable form, including such illustrative, non-exclusives as tripod mounting structures, adhesive mounting structures, etc.

Figure 3:
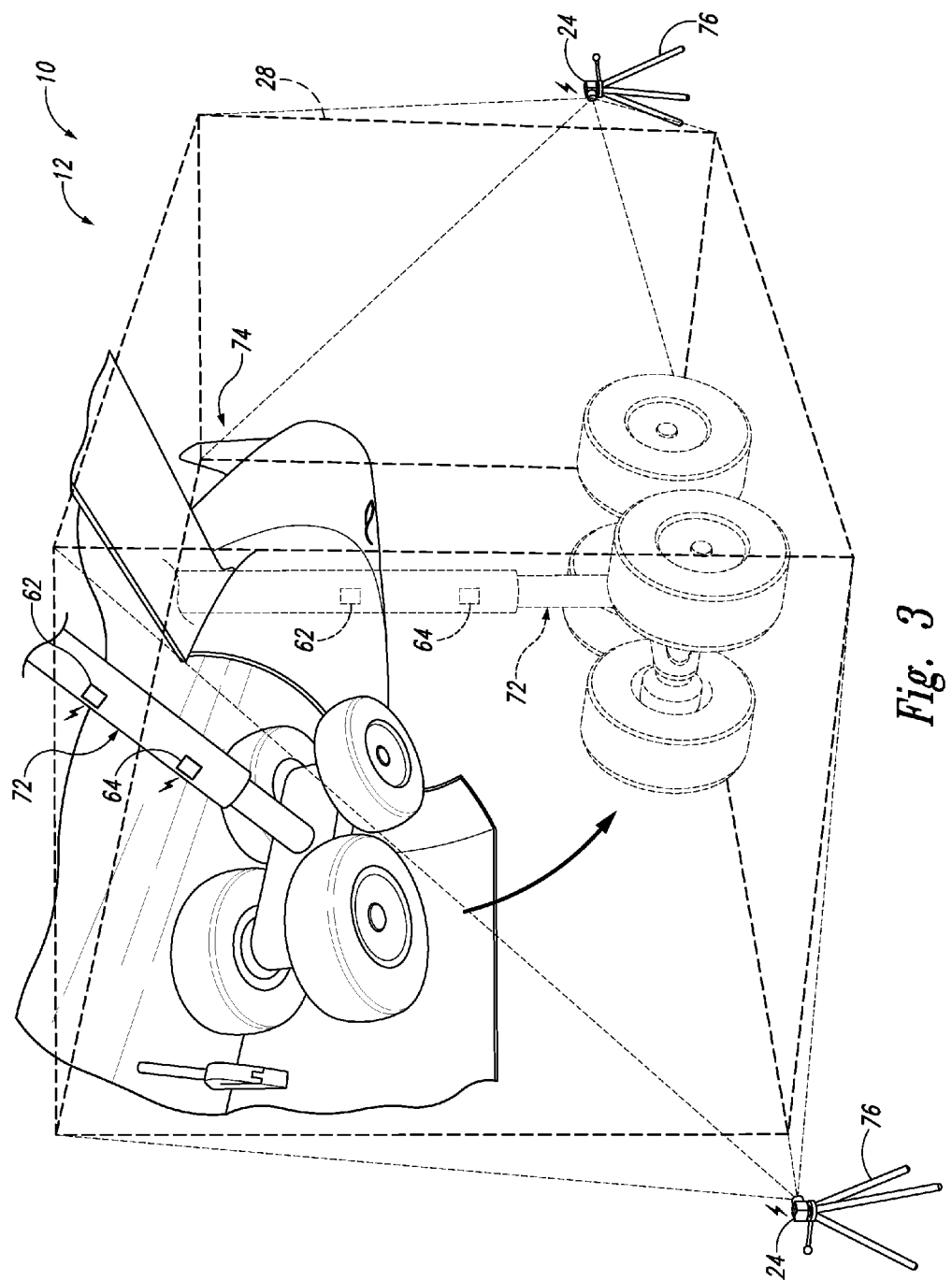
FIG. 3 is a perspective view of an illustrative, non-exclusive example of a production environment and safety system according to the present disclosure associated with landing gear of an aircraft.

Turning now to FIG. 3, an illustrative, non-exclusive example of a safety zone 28 associated with the testing of the landing gear 72 of an aircraft 74 is provided to illustrate some of the optional features that may be associated with a safety system 12 according to the present disclosure. As seen in FIG. 3, two sensing devices 24 are mounted on tripods 76 relative to the landing gear 72, establishing a safety zone 28 around the volume within which the landing gear 72 pivots, or swings, with the safety zone 28 being schematically represented by the dashed volume. The landing gear 72 is a massive structure, and during testing of the landing gear 72, the landing gear 72 swings relative to the rest of the aircraft 74. If an unauthorized human 26, which may be any human, enters the safety zone 28, the sensing devices 24 will detect such presence, and an associated controller 30 may automatically slow, or even stop, movement of the landing gear 72, so that the unauthorized human 26 is not impacted by the landing gear 72. Such a condition may be facilitated by the sensing devices 24 communicating with an associated controller 30 that is tied to or otherwise configured to send a signal to the instrumentation that controls the landing gear 72. Additionally or alternatively, the safety zone 28 may not be established until such time that the landing gear 72 begins to swing, such as detected by an accelerometer or other movement detection device 64 or orientation device 62 operatively coupled to the landing gear 72 and in communication with an associated controller 30 and/or sensing device 24. Various other configurations of safety systems 12 and production environments 10 also may be implemented, and as mentioned, the example of FIG. 3 is provided for illustrative purposes only.

Figure 4:
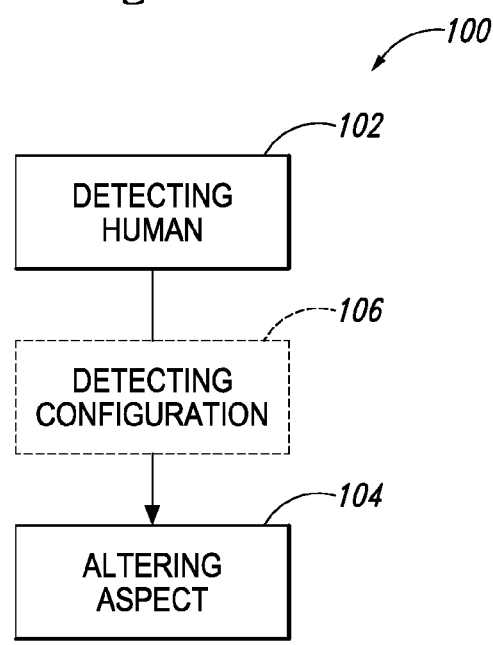
FIG. 4 is a flowchart schematically representing illustrative, non-exclusive examples of safety methods according to the present disclosure.

FIG. 4 schematically provides a flowchart that represents illustrative, non-exclusive examples of methods 100 associated with safety systems 12. The methods and steps illustrated in FIG. 4 are not limiting, and other methods and steps are within the scope of the present disclosure, including methods having greater than or fewer than the number of steps illustrated, as understood from the discussions herein.

Methods 100 include detecting one or more of presence of an unauthorized human 26 and/or an authorized human 38 at least partially within a defined safety zone 28, presence of an unauthorized human 26 and/or an authorized human 38 fully within a defined safety zone 28, imminent entry of an unauthorized human 26 and/or an authorized human 38 into a defined safety zone 28, and/or presence of an unauthorized human 26 and/or an authorized human 38 at least partially within one or more sub-zones of a defined safety zone 28, as indicated at 102, and automatically altering at least one aspect of a production environment 10 responsive to the detecting 102, as indicted at 104.

As discussed herein, examples of the automatically altering 104 include automatically activating an audible alarm 48 and/or a visible alarm 50, automatically slowing movement of a machine tool 20, a work piece or other object 16, and/or an assembly line 14, and/or automatically stopping movement of a machine tool 20, a work piece or other object 16, and/or an assembly line 14. Following the automatically altering 104, the altered aspect of the production environment 10 may be returned to a default configuration following detection of the absence of the unauthorized human 28 within the safety zone 28.

The detecting 102 may include distinguishing between humans and surrounding environment. Additionally or alternatively, the detecting 102 may include distinguishing between human movement and non-human movement. Additionally or alternatively, the detecting 102 may include distinguishing between human thermal signatures and non-human thermal signatures. Additionally or alternatively, the detecting 102 may include detecting presence of one or more tags 36 in the defined safety zone 28.

As optionally illustrated in FIG. 4 at 106, some methods 100 further may include detecting the presence of a predetermined detectable configuration within a safety zone 28, such as associated with one or more of a specifically configured surface, an inventory control system 52, presence of a part 54, movement, location, and/or orientation of a part 54, a machine tool 20, a sensing device 24, and/or an object 16, etc. In such methods 100, the automatically altering 104 may be based in part on the detecting 106 together with the detecting 102.

Illustrative, non-exclusive examples of inventive subject matter according to the present disclosure are described in the following enumerated paragraphs:

A. A safety system for a production environment, the safety system comprising:

at least one sensing device configured to detect (i) presence of an unauthorized human and/or an authorized human at least partially within a defined safety zone, (ii) presence of the unauthorized human and/or the authorized human fully within the defined safety zone, (iii) presence of the unauthorized human and/or the authorized human at least partially within one or more sub-zones of the defined safety zone, and/or (iv) imminent entry of the unauthorized human and/or the authorized human into the defined safety zone; and a controller configured to automatically alter at least one aspect of the production environment responsive to the at least one sensing device detecting (i) presence of the unauthorized human and/or the authorized human at least partially within the defined safety zone, (ii) presence of the unauthorized human and/or the authorized human fully within the defined safety zone, (iii) presence of the unauthorized human and/or the authorized human at least partially within one or more sub-zones of the defined safety zone, and/or (iv) imminent entry of the unauthorized human and/or the authorized human into the defined safety zone.

A1. The safety system of paragraph A, wherein the at least one aspect includes one or more of movement of a machine tool, movement of a work piece, movement of an assembly line, and configuration of a machine tool.

A2. The safety system of any of paragraphs A-A1, wherein the controller is configured to automatically slow movement of a machine tool, to automatically slow movement of a work piece, and/or to automatically slow movement of an assembly line responsive to the at least one sensing device detecting (i) presence of the unauthorized human at least partially within the defined safety zone, (ii) presence of the unauthorized human fully within the defined safety zone, (iii) presence of the unauthorized human at least partially within one or more sub-zones of the defined safety zone, and/or (iv) imminent entry of the unauthorized human into the defined safety zone;

optionally wherein the controller is configured to automatically return movement of the machine tool to a default configuration, to automatically return movement of the work piece to a default configuration, and/or to automatically return movement of the assembly line to a default configuration responsive to the at least one sensing device detecting absence of presence of the unauthorized human at least partially within the defined safety zone.

A3. The safety system of any of paragraphs A-A2, wherein the controller is configured to automatically stop movement of a machine tool, to automatically stop movement of a work piece, and/or to automatically stop movement of an assembly line responsive to the at least one sensing device detecting (i) presence of the unauthorized human at least partially within the defined safety zone, (ii) presence of the unauthorized human fully within the defined safety zone, (iii) presence of the unauthorized human at least partially within one or more sub-zones of the defined safety zone, and/or (iv) imminent entry of the unauthorized human into the defined safety zone;

optionally wherein the controller is configured to automatically return movement of the machine tool to a default configuration, to automatically return movement of the work piece to a default configuration, and/or to automatically return movement of the assembly line to a default configuration responsive to the at least one sensing device detecting absence of presence of the unauthorized human at least partially within the defined safety zone.

A4. The safety system of any of paragraphs A-A3, wherein the at least one aspect includes an audible alarm and/or a visible alarm.

A5. The safety system of any of paragraphs A-A4, wherein the controller is configured to automatically actuate an audible alarm and/or to automatically actuate a visible alarm responsive to the at least one sensing device detecting (i) presence of the unauthorized human at least partially within the defined safety zone, (ii) presence of the unauthorized human fully within the defined safety zone, (iii) presence of the unauthorized human at least partially within one or more sub-zones of the defined safety zone, and/or (iv) imminent entry of the unauthorized human into the defined safety zone;

optionally wherein the controller is configured to automatically cease actuation of the audible alarm and/or to automatically cease actuation of the visible alarm responsive to the at least one sensing device detecting absence of presence of the unauthorized human at least partially within the defined safety zone.

A6. The safety system of any of paragraphs A-A5, wherein the controller is configured to automatically alter a configuration of a machine tool responsive to the at least one sensing device detecting, (i) presence of the authorized human at least partially within the defined safety zone, (ii) presence of the authorized human fully within the defined safety zone, (iii) presence of the authorized human at least partially within one or more sub-zones of the defined safety zone, and/or (iv) imminent entry of the authorized human into the defined safety zone;

optionally wherein the configuration of the machine tool includes a watch and learn configuration.

A7. The safety system of any of paragraphs A-A6, wherein the defined safety zone is associated with the production environment, optionally wherein the production environment is associated with production of aircraft, watercraft, land vehicles, spacecraft, and/or heavy machinery.

A8. The safety system of any of paragraphs A-A7, wherein the defined safety zone is fixed in space.

A9. The safety system of any of paragraphs A-A7, wherein the defined safety zone is configured to move with a machine tool, a work piece, and/or an assembly line.

A10. The safety system of any of paragraphs A-A9, wherein the at least one sensing device is configured to be selectively and operatively coupled to and decoupled from a work piece, optionally without damage to the at least one sensing device and/or the work piece.

A11. The safety system of any of paragraphs A-A10, wherein the defined safety zone is associated with a machine tool, a work piece, and/or an assembly line.

A12. The safety system of any of paragraphs A-A11, wherein the defined safety zone defines a discrete volume of space.

A13. The safety system of any of paragraphs A-A12, wherein the at least one sensing device includes a camera, a multispectral camera, a multispectral sensor, an infrared camera, an infrared sensor, an optical camera, an optical sensor, an ultraviolet camera, an ultraviolet sensor, a combined visible and infrared camera, and/or a wide dynamic range (WDR) camera.

A14. The safety system of any of paragraphs A-A13, wherein the safety system is configured to distinguish between human movement and non-human movement based at least in part on data detected by the at least one sensing device.

A15. The safety system of any of paragraphs A-A14, wherein the safety system is configured to distinguish between human thermal signatures and non-human thermal signatures based at least in part on data detected by the at least one sensing device.

A16. The safety system of any of paragraphs A-A15, wherein the safety system is configured to distinguish humans from surrounding environment based at least in part on data detected by the at least one sensing device.

A17. The safety system of any of paragraphs A-A16, further comprising:

one or more tags, optionally wherein the one or more tags are associated with and/or are configured to be operatively coupled to a human;

wherein the at least one sensing device is configured to detect presence of the one or more tags within the defined safety zone.

A17.1. The safety system of paragraph A17, wherein the safety system is configured to distinguish between a first human associated with a tag of the one or more tags and a second human not associated with a tag of the one or more tags.

A17.1.1. The safety system of paragraph A17.1, wherein the controller is configured to automatically alter the at least one aspect responsive to the at least one sensing device detecting presence of the second human.

A17.1.2. The safety system of paragraph A17.1, wherein the controller is configured to automatically alter the at least one aspect responsive to the at least one sensing device detecting presence of the first human.

A17.2. The safety system of any of paragraphs A17-A17.1.2, wherein the one or more tags each include a predefined detectable configuration, and wherein the at least one sensing device is configured to detect presence of the predefined detectable configuration within the defined safety zone.

A17.2.1. The safety system of paragraph A17.2, wherein the predefined detectable configuration includes one or more of a specifically configured surface, a retro-reflective surface, a surface having predefined distinguishing indicia, a predefined thermal signature, a fluorescence signature, and/or a radiative signature.

A17.3. The safety system of any of paragraphs A17-A17.2.1, wherein the one or more tags are configured to be operatively coupled to and/or worn by a human.

A17.4. The safety system of any of paragraphs A17-A17.3, wherein the one or more tags are configured to be operatively coupled to, are embodied in, and/or comprise one or more of clothing, a vest, a harness, a sash, a glove, headgear, a helmet, a jumpsuit, a jacket, pants, a top, a bottom, sleeves, an arm band, a leg band, a neck band, a head band, a ring, a bracelet, a knee band, and an anklet.

A18. The safety system of any of paragraphs A-A17.4, wherein the safety system is configured to interface with an inventory control system associated with the production environment.

A19. The safety system of any of paragraphs A-A18, further comprising:
an inventory control system associated with the production environment.

A20. The safety system of any of paragraphs A18-A19, wherein the controller is configured to automatically alter the at least one aspect of the production environment responsive to (i) the at least one sensing device detecting (a) presence of the unauthorized human and/or the authorized human at least partially within the defined safety zone, (b) presence of the unauthorized human and/or the authorized human fully within the defined safety zone, (c) presence of the unauthorized human and/or the authorized human at least partially within one or more sub-zones of the defined safety zone, and/or (d) imminent entry of the unauthorized human and/or the authorized human into the defined safety zone, and (ii) a predefined configuration associated with the inventory control system.

A20.1. The safety system of paragraph A20, wherein the predefined configuration associated with the inventory control system includes one or more of presence of a predetermined part within the defined safety zone, presence of a predetermined part on a work piece, presence of a predetermined part within a predetermined locale, movement of a predetermined part within the safety zone, movement of a predetermined part relative to a work piece, and/or movement of a predetermined part within a predetermined locale.

A21. The safety system of any of paragraphs A16-A18.1, wherein the safety system is configured to establish the defined safety zone responsive to presence of a predetermined part within a predetermined locale.

A22. The safety system of any of paragraphs A18-A21, wherein the safety system is configured to establish the defined safety zone responsive to movement of a predetermined part within a predetermined locale.

A23. The safety system of any of paragraphs A18-A22, wherein the inventory control system includes radio-frequency identification (RFID) tags associated with parts.

A24. The safety system of any of paragraphs A18-A23, wherein the inventory control system includes location awareness system features associated with parts.

A25. The safety system of any of paragraphs A-A24, further comprising:
a location awareness system feature associated with the at least one sensing device.

A25.1. The safety system of paragraph A25, wherein the controller is configured to automatically alter the at least one aspect of the production environment responsive to (i) the at least one sensing device detecting (a) presence of the unauthorized human and/or the authorized human at least partially within the defined safety zone, (b) presence of the unauthorized human and/or the authorized human fully within the defined safety zone, (c) presence of the unauthorized human and/or the authorized human at least partially within one or more sub-zones of the defined safety zone, and/or (d) imminent entry of the unauthorized human and/or the authorized human into the defined safety zone, and (ii) the at least one sensing device being positioned within a predetermined locale.

A26. The safety system of any of paragraphs A-A25.1, further comprising:
an orientation device configured to detect an orientation of one of the at least one sensing device, a work piece, and a machine tool;
wherein the controller is configured to automatically alter the at least one aspect of the production environment responsive to (i) the at least one sensing device detecting (a) presence of the unauthorized human and/or the authorized human at least partially within the defined safety zone, (b) presence of the unauthorized human and/or the authorized human fully within the defined safety zone, (c) presence of the unauthorized human and/or the authorized human at least partially within one or more sub-zones of the defined safety zone, and/or (d) imminent entry of the unauthorized human and/or the authorized human into the defined safety zone, and (ii) the orientation of one of the at least one sensing device, the work piece, and the machine tool.

A27. The safety system of any of paragraphs A-A26, further comprising:
a movement detection device configured to detect movement of one of the at least one sensing device, a work piece, and a machine tool;
wherein the controller is configured to automatically alter the at least one aspect of the production environment responsive to (i) the at least one sensing device detecting (a) presence of the unauthorized human and/or the authorized human at least partially within the defined safety zone, (b) presence of the unauthorized human and/or the authorized human fully within the defined safety zone, (c) presence of the unauthorized human and/or the authorized human at least partially within one or more sub-zones of the defined safety zone, and/or (d) imminent entry of the unauthorized human and/or the authorized human into the defined safety zone, and (ii) the movement of one of the at least one sensing device, the work piece, and the machine tool.

A28. The safety system of any of paragraphs A-A27, wherein the at least one sensing device is further configured to detect a predetermined orientation of a work piece and/or a machine tool within the defined safety zone; and wherein the controller is configured to automatically alter the at least one aspect of the production environment responsive to (i) the at least one sensing device detecting (a) presence of the unauthorized human and/or the authorized human at least partially within the defined safety zone, (b) presence of the unauthorized human and/or the authorized human fully within the defined safety zone, (c) presence of the unauthorized human and/or the authorized human at least partially within one or more sub-zones of the defined safety zone, and/or (d) imminent entry of the unauthorized human and/or the authorized human into the defined safety zone, and (ii) the at least one sensing device detecting the predetermined orientation of the work piece and/or the machine tool within the defined safety zone.

A29. The safety system of any of paragraphs A-A28, wherein the at least one sensing device includes a plurality of sensing devices.

A29.1. The safety system of paragraph A29, wherein the plurality of sensing devices are configured to communicate with each other.

A29.2. The safety system of any of paragraphs A29-A29.1, wherein at least one sensing device of the plurality of sensing devices is configured to detect presence of one or more additional sensing devices of the plurality of sensing devices within a predetermined locale, and optionally to establish the defined safety zone based at least in part on the presence of the one or more additional sensing devices within the predetermined locale.

A29.3. The safety system of any of paragraphs A29-A29.2, wherein the safety system is configured to establish the defined safety zone based at least in part on overlapping sensing zones of two or more of the plurality of sensing devices.

A30. The safety system of any of paragraphs A-A29.3, wherein the defined safety zone is established by the at least one sensing device.

A30.1. The safety system of paragraph A30, wherein the defined safety zone corresponds to a field of view of the at least one sensing device.

A30.2. The safety system of any of paragraphs A30-A30.1, wherein the defined safety zone corresponds to a sensing zone of the at least one sensing device.

A30.3. The safety system of any of paragraphs A30-A30.1, wherein the defined safety zone corresponds to a full extent of a sensing zone of the at least one sensing device.

A30.4. The safety system of any of paragraphs A30-A30.1, wherein the defined safety zone corresponds to a subset of a sensing zone of the at least one sensing device.

A31. The safety system of any of paragraphs A-A30.4, wherein the safety system has at least a default state and an alert state;

wherein in the default state, the at least one aspect of the product environment is not altered; and wherein in the alert state, the at least one aspect of the production environment is altered.

A31.1. The safety system of paragraph A31, further comprising:

an audible alarm and/or a visible alarm;

wherein in the default state, the audible alarm and/or the visible alarm is/are not activated; and wherein in the alert state, the audible alarm and/or the visible alarm is/are activated.

A31.2. The safety system of any of paragraphs A31-A31.1, wherein in the default state, one of a machine tool, a work piece, and an assembly line is moving; and wherein in the alert state, the one of the machine tool, the work piece, and the assembly line is not moving.

A31.3. The safety system of any of paragraphs A31-A31.1, wherein in the default state, one of a machine tool, a work piece, and an assembly line is moving at a first speed; and wherein in the alert state, the one of the machine tool, the work piece, and the assembly line is moving at a second speed that is less than the first speed.

A31.4. The safety system of any of paragraphs A31-A31.3, wherein in the default state, no unauthorized human is positioned within the defined safety zone; and wherein in the alert state, at least a portion of an unauthorized human is positioned within the defined safety zone, the unauthorized human is fully positioned within the defined safety zone, at least a portion of the unauthorized human is positioned within one or more sub-zones of the defined safety zone, and/or the unauthorized human is imminently about to enter the defined safety zone.

A31.5. The safety system of any of paragraphs A31-A31.3 when depending from paragraph A17, wherein in the default state, no human without a tag is positioned within the defined safety zone and/or is imminently about to enter the defined safety zone; and wherein in the alert state, at least a portion of a human without a tag is positioned within the defined safety zone, is positioned within a sub-zone of the defined safety zone, and/or is imminently about to enter the defined safety zone.

A31.6. The safety system of any of paragraphs A31-A31.3 when depending from paragraph A17, wherein in the default state, no human with a tag is positioned within the defined safety zone and/or is imminently about to enter the defined safety zone; and wherein in the alert zone, at least a portion of a human with a tag is positioned within the defined safety zone, a human with a tag is positioned fully within the defined safety zone, at least a portion of a human with a tag is positioned within a sub-zone of the defined safety zone, and/or a human with a tag is imminently about to enter the defined safety zone.

A32. A safety system for a production environment, the safety system comprising:

at least one sensing device configured to detect (i) imminent entry of an unauthorized human into a defined safety zone, and (ii) presence of the unauthorized human at least partially within the defined safety zone; and a controller configured to (i) automatically alter a first aspect of the production environment responsive to the at least one sensing device detecting imminent entry of the unauthorized human into the defined safety zone, and (i) automatically alter a second aspect of the production environment responsive to the at least one sensing device detecting presence of the unauthorized human at least partially within the defined safety zone, optionally wherein the second aspect is different from the first aspect, and optionally wherein the second aspect is configured to have a greater hazard deterring effect than the first aspect.

A32.1. The safety system of paragraph A32, wherein the at least one sensing device is further configured to detect (iii) presence of the unauthorized human fully within the defined safety zone; and wherein the controller is further configured to (iii) automatically alter a third aspect of the production environment responsive to the at least one sensing device detecting presence of the unauthorized human fully within the defined safety zone, optionally wherein the third aspect is different than the first aspect and the second aspect, and optionally wherein the third aspect is configured to have a greater hazard deterring effect than the second aspect.

A33. A safety system for a production environment, the safety system comprising:

at least one sensing device configured to detect (i) presence of the unauthorized human at least partially within the defined safety zone, and (ii) presence of the unauthorized human at least partially within a sub-zone of the defined safety zone, wherein the sub-zone is spaced inwardly from a perimeter of the defined safety zone; and a controller configured to (i) automatically alter a first aspect of the production environment responsive to the at least one sensing device detecting presence of the unauthorized human at least partially within the defined safety zone, and (ii) automatically alter a second aspect of the production environment responsive to the at least one sensing device detecting presence of the unauthorized human at least partially within the sub-zone, optionally wherein the second aspect is different from the first aspect, and optionally wherein the second aspect is configured to have a greater hazard deterring effect than the first aspect.

A34. The safety system of any of paragraphs A32-A33, further comprising the subject matter of any of paragraphs A-A31.6.

B. A safety method implemented in a production environment, the safety method comprising:

detecting one or more of (i) presence of an unauthorized human and/or an authorized human at least partially within a defined safety zone, (ii) presence of the unauthorized human and/or the authorized human fully within the defined safety zone, (iii) presence of the unauthorized human and/or the authorized human at least partially within one or more sub-zones of the defined safety zone, and/or (iv) imminent entry of the unauthorized human and/or the authorized human into the defined safety zone; and automatically altering at least one aspect of the production environment responsive to the detecting.

B1. The safety method of paragraph, wherein the at least one aspect includes one or more of movement of a machine tool, movement of a work piece, and movement of an assembly line.

B2. The safety method of any of paragraphs B-B1, wherein the automatically altering includes automatically slowing movement of a machine tool, automatically slowing movement of a work piece, and/or automatically slowing movement of an assembly line.

B2.1. The safety method of paragraph B2, further comprising:

following the automatically slowing, detecting (i) absence of presence of the unauthorized human at least partially within the defined safety zone, (ii) absence of presence of the unauthorized human fully within the defined safety zone, (iii) absence of presence of the unauthorized human at least partially within one or more sub-zones of the defined safety zone, and/or (iv) absence of imminent entry of the unauthorized human into the defined safety zone; and automatically returning movement of the machine tool to a default configuration, returning movement of the work piece to a default configuration, and/or automatically returning movement of the assembly line to a default configuration responsive to the detecting absence.

B3. The safety method of any of paragraphs B-B2.1, wherein the automatically altering includes automatically stopping movement of a machine tool, automatically stopping movement of a work piece, and/or automatically stopping movement of an assembly line.

B3.1. The safety method of paragraph B3, further comprising:

following the automatically stopping, detecting (i) absence of presence of the unauthorized human at least partially within the defined safety zone, (ii) absence of presence of the unauthorized human fully within the defined safety zone, (iii) absence of presence of the unauthorized human at least partially within one or more sub-zones of the defined safety zone, and/or (iv) absence of imminent entry of the unauthorized human into the defined safety zone; and automatically returning movement of the machine tool to a default configuration, returning movement of the work piece to a default configuration, and/or automatically returning movement of the assembly line to a default configuration responsive to the detecting absence.

B4. The safety method of any of paragraphs B-B3.1, wherein the at least one aspect includes an audible alarm and/or a visible alarm.

B5. The safety method of any of paragraphs B-B4, wherein the automatically altering includes automatically actuating an audible alarm and/or to automatically actuating a visible alarm.

B5.1. The safety method of paragraph B5, further comprising:

following the automatically actuating, detecting (i) absence of presence of the unauthorized human at least partially within the defined safety zone, (ii) absence of presence of the unauthorized human fully within the defined safety zone, (iii) absence of presence of the unauthorized human at least partially within one or more sub-zones of the defined safety zone, and/or (iv) absence of imminent entry of the unauthorized human into the defined safety zone; and automatically ceasing actuating of the audible alarm and/or the visible alarm responsive to the detecting absence.

B6. The safety method of any of paragraphs B-B5.1, wherein the automatically altering includes automatically a configuration of a machine tool responsive the detecting, optionally wherein the configuration of the machine tool includes a watch and learn configuration.

B7. The safety method of any of paragraphs B-B6, wherein the defined safety zone is associated with the production environment, optionally wherein the production environment is associated with production of aircraft, watercraft, land vehicles, spacecraft, and/or heavy machinery.

B8. The safety method of any of paragraphs B-B7, wherein the defined safety zone is fixed in space.

B9. The safety method of any of paragraphs B-B7, wherein the defined safety zone moves with a machine tool, a work piece, and/or an assembly line.

B10. The safety method of any of paragraphs B-B9, wherein the detecting is performed by at least one sensing device that is configured to be selectively and operatively coupled to and decoupled from a work piece, optionally without damage to the at least one sensing device and/or the work piece.

B11. The safety method of any of paragraphs B-B10, wherein the defined safety zone is associated with a machine tool, a work piece, and/or an assembly line.

B12. The safety method of any of paragraphs B-B11, wherein the defined safety zone defines a discrete volume of space.

B13. The safety method of any of paragraphs B-B12, wherein the detecting is performed by at least one sensing device that includes a camera, a multispectral camera, a multispectral sensor, an infrared camera, an infrared sensor, an optical camera, an optical sensor, an ultraviolet camera, an ultraviolet sensor, a combined visible and infrared camera, and/or a wide dynamic range (WDR) camera.

B14. The safety method of any of paragraphs B-B13, wherein the detecting includes distinguishing between human movement and non-human movement in the defined safety zone.

B15. The safety method of any of paragraphs B-B14, wherein the detecting includes distinguishing between human thermal signatures and non-human thermal signatures in the defined safety zone.

B16. The safety method of any of paragraphs B-B15, wherein the detecting includes distinguishing humans from surrounding environment.

B17. The safety method of any of paragraphs B-B16, wherein the detecting includes detecting presence of one or more tags in the defined safety zone, optionally wherein the one or more tags are associated with and/or are configured to be operatively coupled to a human.

B17.1. The safety method of paragraph B17, wherein the detecting includes distinguishing between a first human associated with a tag of the one or more tags and a second human not associated with a tag of the one or more tags.

B17.1.1. The safety method of paragraph B17.1, wherein the automatically altering is responsive to detecting presence of the first human within the defined safety zone.

B17.1.2. The safety method of paragraph B17.1, wherein the automatically altering is responsive to detecting presence of the second human within the defined safety zone.

B17.2. The safety method of any of paragraphs B17-B17.1.2, wherein the one or more tags each include a predefined detectable configuration, the method further comprising:
detecting presence of the predefined detectable configuration within the defined safety zone.

B17.2.1. The safety method of paragraph B17.2, wherein the predefined detectable configuration includes one or more of a specifically configured surface, a retro-reflective surface, a surface having predefined distinguishing indicia, a predefined thermal signature, a fluorescence signature, and/or a radiative signature.

B17.3. The safety method of any of paragraphs B17-B17.2.1, wherein the one or more tags are operatively coupled to and/or are worn by the human.

B17.4. The safety method of any of paragraphs B17-B17.4, wherein the one or more tags are operatively coupled to, are embodied in, and/or comprised of one or more of clothing, a vest, a harness, a sash, a glove, headgear, a helmet, a jumpsuit, a jacket, pants, a top, a bottom, sleeves, an arm band, a leg band, a neck band, a head band, a ring, a bracelet, a knee band, and an anklet.

B18. The safety method of any of paragraphs B-B17.4, wherein the automatically altering the at least one aspect of the production environment is further responsive to a predefined configuration associated with an inventory control system.

B18.1. The safety method of paragraph B18, further comprising:
detecting the predetermined configuration associated with the inventory control system, wherein the predefined configuration associated with the inventory control system includes one or more of presence of a predetermined part within the defined safety zone, presence of a predetermined part on a work piece, presence of a predetermined part within a predetermined locale, movement of a predetermined part within the safety zone, movement of a predetermined part relative to a work piece, and/or movement of a predetermined part within a predetermined locale.

B18.2. The safety method of any of paragraphs B18-B18.1, further comprising:
detecting presence of a predetermined part within a predetermined locale; and
defining the defined safety zone responsive to presence of the predetermined part within the predetermined locale.

B18.3. The safety method of any of paragraphs B18-B18.2, further comprising:
detecting movement of a predetermined part within a predetermined locale; and
defining the defined safety zone responsive to movement of the predetermined part within the predetermined locale.

B18.4. The safety method of any of paragraphs B18-B18.3, wherein the inventory control system includes radio-frequency identification (RFID) tags associated with parts.

B18.5. The safety method of any of paragraphs B18-B18.4, wherein the inventory control system includes location awareness system features associated with parts.

B19. The safety method of any of paragraphs B-B18.5, wherein the detecting is performed by at least one sensing device, the safety method further comprising:
tracking movement of the at least one sensing device, a work piece, and/or a machine tool, optionally wherein the tracking is performing utilizing a location awareness system;
wherein the automatically altering the at least one aspect of the production environment is further responsive to the movement of the at least one sensing device, the work piece, and/or the machine tool.

B19.1. The safety method of paragraph B19, wherein the automatically altering the at least one aspect of the production environment is further responsive to the at least one sensing device, the work piece, and/or the machine tool moving into a predetermined locale.

B20. The safety method of any of paragraphs B-B19.1, wherein the detecting is performed by at least one sensing device, the safety method further comprising:
detecting an orientation of one of the at least one sensing device, a work piece, and a machine tool;
wherein the automatically altering the at least one aspect of the production environment is further responsive to the orientation of the at least one sensing device, a work piece, and a machine tool.

B21. The safety method of any of paragraphs B-B20, wherein the detecting is performed by a plurality of sensing devices.

B21.1. The safety method of paragraph B21, wherein the plurality of sensing devices are configured to communicate with each other.

B21.2. The safety method of any of paragraphs B21-B21.1, further comprising:
establishing the defined safety zone based at least in part on an overlapping sense zone of two or more of the plurality of sensing devices.

B22. A safety method implemented in a production environment, the safety method comprising:
detecting imminent entry of an unauthorized human into a defined safety zone;
automatically altering a first aspect of the production environment responsive to the detecting imminent entry;
detecting presence of the unauthorized human at least partially within the defined safety zone; and
automatically altering a second aspect of the production environment responsive to the detecting presence, optionally wherein the second aspect is different than the first aspect, and optionally wherein the second aspect is configured to have a greater hazard deterring effect than the first aspect.

B22.1. The safety method of paragraph B20, further comprising:
    detecting presence of the unauthorized human fully within the defined safety zone; and
    automatically altering a third aspect of the production environment responsive to the detecting presence of the unauthorized human fully within the defined safety zone, optionally wherein the third aspect is different from the first aspect and the second aspect, and optionally wherein the third aspect is configured to have a greater hazard deterring effect than the second aspect.

B23. A safety method implemented in a production environment, the safety method comprising:
    detecting presence of an unauthorized human at least partially within a defined safety zone;
    automatically altering a first aspect of the production environment responsive to the detecting presence of the unauthorized human at least partially within the defined safety zone;
    detecting presence of the unauthorized human at least partially within a sub-zone of the defined safety zone, wherein the sub-zone is spaced inwardly from a perimeter of the defined safety zone; and
    automatically altering a second aspect of the production environment responsive to the detecting presence of the unauthorized human at least partially within the sub-zone, optionally wherein the second aspect is different than the first aspect, and optionally wherein the second aspect is configured to have a greater hazard deterring effect than the first aspect.

B24. The safety method of any of paragraphs B22-B23, further comprising the subject matter of any of paragraphs B-B21.2.

B25. The safety method of any of paragraphs B-B24, wherein the method is facilitated by the safety system of any of paragraphs A-A34.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A safety system for a production environment, the safety system comprising:
    at least one sensing device configured to detect thermal imagery of humans at least partially within a defined safety zone; and
    a controller having non-transitory computer-readable storage media including computer-executable instructions that, when executed, automatically alter at least one aspect of the production environment responsive to the at least one sensing device detecting presence of an unauthorized human at least partially within the defined safety zone, wherein automatically alter at least one aspect of the production environment comprises automatically slow or stop movement of a machine tool or automatically slow or stop movement of a work piece;
    wherein the safety system is configured to distinguish between human thermal signatures of a torso and limbs and non-human thermal signatures based at least in part on thermal imagery data detected by the at least one sensing device;
    wherein the safety system has at least a default state and an alert state;
    wherein in the default state, the at least one aspect of the product environment is not altered and no unauthorized human is positioned within the defined safety zone;
    wherein in the alert state, the at least one aspect of the production environment is altered and at least a portion of an unauthorized human is positioned within the defined safety zone;
    wherein the at least one sensing device is further configured to detect imminent entry of the unauthorized human into the defined safety zone, and
    wherein the at least one sensing device is further configured to detect presence of the unauthorized human fully within the defined safety zone; and
    wherein the computer-executable instructions, when executed, (i) automatically actuate an alarm responsive to the at least one sensing device detecting imminent entry of the unauthorized human into the defined safety zone, (ii) automatically slow movement of the machine tool or automatically slow movement of the work piece responsive to the at least one sensing device detecting presence of the unauthorized human partially within the defined safety zone, and (iii) automatically stop movement of the machine tool or automatically stop movement of the work piece responsive to the at least one sensing device detecting presence of the unauthorized human fully within the defined safety zone.

2. The safety system of claim 1,
    wherein the at least one sensing device is further configured to detect presence of the unauthorized human at least partially within a sub-zone of the defined safety zone, wherein the sub-zone is spaced inwardly from a perimeter of the defined safety zone; and
    wherein the computer-executable instructions, when executed, (i) automatically alter a first aspect of the production environment responsive to the at least one sensing device detecting presence of the unauthorized human at least partially within the defined safety zone, and (ii) automatically alter a second aspect of the production environment responsive to the at least one sensing device detecting presence of the unauthorized human at least partially within the sub-zone, wherein the second aspect is different than the first aspect.

3. The safety system of claim 1, wherein the defined safety zone is associated with the production environment, and wherein the production environment is associated with production of aircraft.

4. The safety system of claim 1, wherein the defined safety zone defines a discrete volume of space corresponding to a field of view of the at least one sensing device.

5. The safety system of claim 1, wherein the at least one sensing device includes a multispectral camera.

6. The safety system of claim 1, further comprising:
one or more tags, wherein the one or more tags are configured to be operatively coupled to a human;
wherein the at least one sensing device is configured to detect presence of the one or more tags within the defined safety zone.

7. The safety system of claim 6, wherein the safety system is configured to distinguish between a first human associated with a tag of the one or more tags and a second human not associated with a tag of the one or more tags.

8. The safety system of claim 7, wherein the computer-executable instructions, when executed, automatically alter the at least one aspect responsive to the at least one sensing device detecting presence of the first human at least partially within the defined safety zone.

9. The safety system of claim 7, wherein the computer-executable instructions, when executed, automatically alter the at least one aspect responsive to the at least one sensing device detecting presence of the second human at least partially within the defined safety zone.

10. The safety system of claim 6,
wherein the one or more tags each include a predefined detectable configuration, and wherein the at least one sensing device is configured to detect presence of the predefined detectable configuration within the defined safety zone;
wherein the predefined detectable configuration includes one or more of a specifically configured surface, a retro-reflective surface, a surface having predefined distinguishing indicia, a predefined thermal signature, a fluorescence signature, and/or a radiative signature.

11. The safety system of claim 1,
wherein the safety system is configured to interface with an inventory control system associated with the production environment; and
wherein the computer-executable instructions, when executed, automatically alter the at least one aspect of the production environment responsive to (i) the at least one sensing device detecting presence of the unauthorized human at least partially within the defined safety zone and (ii) a predefined configuration associated with the inventory control system.

12. The safety system of claim 11, wherein the predefined configuration associated with the inventory control system includes one or more of presence of a predetermined part within the defined safety zone, presence of a predetermined part on a work piece, presence of a predetermined part within a predetermined locale, movement of a predetermined part within the safety zone, movement of a predetermined part relative to a work piece, and/or movement of a predetermined part within a predetermined locale, wherein the predetermined part is a component of an object being manufactured in the production environment.

13. The safety system of claim 1, further comprising:
an orientation device configured to detect an orientation of the at least one sensing device;
wherein the computer-executable instructions, when executed, automatically alter the at least one aspect of the production environment responsive to (i) the at least one sensing device detecting presence of the unauthorized human at least partially within the defined safety zone and (ii) the orientation of the at least one sensing device.

14. The safety system of claim 1, further comprising:
a movement detection device configured to detect movement of a work piece;
wherein the computer-executable instructions, when executed, automatically alter the at least one aspect of the production environment responsive to (i) the at least one sensing device detecting presence of the unauthorized human at least partially within the defined safety zone and (ii) the movement of the work piece.

15. The safety system of claim 1,
wherein the at least one sensing device is further configured to detect a predetermined orientation of a work piece within the defined safety zone; and
wherein the computer-executable instructions, when executed, automatically alter the at least one aspect of the production environment responsive to (i) the at least one sensing device detecting presence of the unauthorized human at least partially within the defined safety zone and (ii) the at least one sensing device detecting the predetermined orientation of the work piece.

16. The safety system of claim 1,
wherein the at least one sensing device includes a plurality of sensing devices; and
wherein at least one sensing device of the plurality of sensing devices is configured to detect presence of one or more additional sensing devices of the plurality of sensing devices within a predetermined locale to establish the defined safety zone based at least in part on the presence of the one or more additional sensing devices within the predetermined locale.

17. The safety system of claim 1,
wherein the at least one sensing device includes a plurality of sensing devices; and
wherein the safety system is configured to establish the defined safety zone based at least in part on overlapping sensing zones of two or more of the plurality of sensing devices.

18. The safety system of claim 1,
wherein the defined safety zone is established by the at least one sensing device; and
wherein the defined safety zone corresponds to a field of view of the at least one sensing device.

19. A safety method utilizing the safety system of claim 1, the safety method comprising:
detecting presence of the unauthorized human at least partially within the defined safety zone, wherein the detecting includes distinguishing between human movement and non-human movement in the defined safety zone based at least in part on thermal imagery data detected by the at least one sensing device; and
automatically altering at least one aspect of the production environment responsive to the detecting.

20. A safety method implemented by a safety system for a production environment, wherein the safety system comprises at least one sensing device configured to detect thermal imagery of humans at least partially within a defined safety zone that defines a discrete volume of space, the safety method comprising:
- distinguishing between human thermal signatures of a torso and limbs and non-human thermal signatures based at least in part on thermal imagery data detected by the at least one sensing device;
- interfacing with an inventory control system associated with the production environment;
- automatically altering at least one aspect of the production environment responsive to (i) the at least one sensing device detecting presence of the unauthorized human at least partially within the defined safety zone and (ii) a predefined configuration associated with the inventory control system, wherein the automatically altering at least one aspect of the production environment comprises automatically slowing or stopping movement of a machine tool or automatically slowing or stopping movement of a work piece;
- wherein the predefined configuration associated with the inventory control system includes one or more of presence of a predetermined part within the defined safety zone, presence of a predetermined part on a work piece, presence of a predetermined part within a predetermined locale, movement of a predetermined part within the safety zone, movement of a predetermined part relative to a work piece, and/or movement of a predetermined part within a predetermined locale;
- wherein the safety system has at least a default state and an alert state;
- wherein in the default state, the at least one aspect of the product environment is not altered and no unauthorized human is positioned within the defined safety zone;
- wherein in the alert state, the at least one aspect of the production environment is altered and at least a portion of an unauthorized human is positioned within the defined safety zone;
- wherein the at least one sensing device is further configured to detect imminent entry of the unauthorized human into the defined safety zone, and
- wherein the at least one sensing device is further configured to detect presence of the unauthorized human fully within the defined safety zone; and
- wherein the safety method further comprises:
  - automatically actuating an alarm responsive to the at least one sensing device detecting imminent entry of the unauthorized human into the defined safety zone;
  - automatically slowing movement of the machine tool or automatically slowing movement of the work piece responsive to the at least one sensing device detecting presence of the unauthorized human partially within the defined safety zone; and
  - automatically stopping movement of the machine tool or automatically stopping movement of the work piece responsive to the at least one sensing device detecting presence of the unauthorized human fully within the defined safety zone.

21. A controller having non-transitory computer-readable storage media including computer-executable instructions that, when executed:
- automatically alter at least one aspect of a production environment responsive to at least one sensing device detecting presence of an unauthorized human at least partially within a defined safety zone, wherein automatically alter at least one aspect of the production environment comprises automatically alter a speed of a machine tool or a work piece;
- distinguish between human thermal signatures of a torso and limbs and non-human thermal signatures based at least in part on thermal imagery data detected by the at least one sensing device;
- not automatically alter the at least one aspect of the product environment when no unauthorized human is positioned within the defined safety zone;
- automatically actuate an alarm responsive to detecting imminent entry of the unauthorized human into the defined safety zone;
- automatically slow movement of the machine tool or automatically slow movement of the work piece responsive to detecting presence of the unauthorized human partially within the defined safety zone; and
- automatically stop movement of the machine tool or automatically stop movement of the work piece responsive to detecting presence of the unauthorized human fully within the defined safety zone.

* * * * *